(12) United States Patent
DePue et al.

(10) Patent No.: US 7,014,208 B2
(45) Date of Patent: Mar. 21, 2006

(54) INTERIOR VEHICLE TRIM PANEL

(75) Inventors: Todd DePue, Brighton, MI (US);
Robert J. Adams, Ypsilanti, MI (US);
Michael J. Hier, Milford, MI (US);
Glenn A. Cowelchuk, Chesterfield Township, MI (US)

(73) Assignee: Lear Corporation, Southfield, MI (US)

( * ) Notice: Subject to any disclaimer, the term of this patent is extended or adjusted under 35 U.S.C. 154(b) by 192 days.

(21) Appl. No.: 10/431,696

(22) Filed: May 8, 2003

(65) Prior Publication Data

US 2004/0183279 A1    Sep. 23, 2004

Related U.S. Application Data

(63) Continuation-in-part of application No. 10/394,130, filed on Mar. 21, 2003.

(51) Int. Cl.
    *B60R 21/20* (2006.01)

(52) U.S. Cl. .................... 280/728.3; 280/732; 296/70; 428/43

(58) Field of Classification Search ................. 180/90; 280/728.3, 732; 296/39.1, 70; 428/43
See application file for complete search history.

(56) References Cited

U.S. PATENT DOCUMENTS

| | | |
|---|---|---|
| 4,714,575 A | 12/1987 | Preston |
| 5,225,214 A | 7/1993 | Filion |
| 5,304,273 A | 4/1994 | Kenrick et al. |
| 5,316,715 A | 5/1994 | Gray |
| 5,346,249 A | 9/1994 | Hallard et al. |
| 5,348,339 A | 9/1994 | Turner |
| 5,393,089 A | 2/1995 | Pakulsky et al. |
| 5,427,408 A * | 6/1995 | Ando et al. ............ 280/728.3 |
| 5,456,490 A * | 10/1995 | Carter et al. ............ 280/728.3 |
| 5,501,890 A | 3/1996 | Mills |
| 5,564,731 A | 10/1996 | Gallagher et al. |
| 5,590,901 A * | 1/1997 | MacGregor ............ 280/728.3 |
| 5,611,564 A * | 3/1997 | Bauer ............ 280/728.3 |
| 5,622,402 A | 4/1997 | Pritchard et al. |
| 5,639,115 A * | 6/1997 | Kelley et al. ............ 280/728.3 |
| 5,738,367 A * | 4/1998 | Zichichi et al. ............ 280/728.3 |
| 5,744,776 A * | 4/1998 | Bauer ............ 219/121.7 |
| 5,794,967 A | 8/1998 | Manire |
| 5,803,487 A | 9/1998 | Kikuchi et al. |
| 5,975,562 A * | 11/1999 | Yamamoto et al. ...... 280/728.3 |
| 5,975,563 A | 11/1999 | Gallagher et al. |
| 5,979,931 A * | 11/1999 | Totani et al. ............ 280/728.3 |
| 5,997,030 A * | 12/1999 | Hannert et al. ............ 280/728.3 |
| 6,070,901 A * | 6/2000 | Hazell et al. ............ 280/728.3 |
| 6,076,851 A | 6/2000 | Davis, Jr. et al. |
| 6,089,642 A | 7/2000 | Davis, Jr. et al. |
| 6,092,835 A | 7/2000 | Thakore et al. |
| 6,093,272 A | 7/2000 | Visconti et al. |
| 6,095,272 A | 8/2000 | Takiguchi et al. |

(Continued)

*Primary Examiner*—Paul N. Dickson
*Assistant Examiner*—Laura B. Rosenberg
(74) *Attorney, Agent, or Firm*—MacMillan, Sobanski & Todd, LLC (57) ABSTRACT

An overmolded interior vehicle trim panel includes a substrate having a front face and an under face. The under face has a tear seam integrally molded therein to allow an airbag to exit the substrate when the airbag is deployed. The tear seam defines an airbag door. An outer layer is bonded to the front face of the substrate in a mold, thereby forming an overmolded interior vehicle trim panel. The trim panel can include a sheet of hinge material attached to one of the substrate and the outer layer of the overmolded interior trim panel. A portion of the sheet of hinge material defines a hinge member.

15 Claims, 4 Drawing Sheets

U.S. PATENT DOCUMENTS

| | | |
|---|---|---|
| 6,145,871 A | 11/2000 | Davis, Jr. et al. |
| 6,210,614 B1 * | 4/2001 | Gardner et al. ............ 264/46.5 |
| 6,217,098 B1 | 4/2001 | O'Brien et al. |
| 6,250,669 B1 | 6/2001 | Ohmiya |
| 6,440,514 B1 * | 8/2002 | Ueno et al. .................... 428/43 |
| 6,453,535 B1 * | 9/2002 | Nicholas ...................... 29/413 |
| 6,460,880 B1 | 10/2002 | Gallagher et al. |
| 6,533,312 B1 | 3/2003 | Labrie et al. |
| 6,539,612 B1 * | 4/2003 | Brown et al. ................. 29/611 |
| 6,595,543 B1 * | 7/2003 | Desprez .................. 280/728.3 |
| 6,612,608 B1 * | 9/2003 | Schmidt et al. .......... 280/728.3 |
| 6,644,685 B1 | 11/2003 | Sun et al. |
| 6,742,804 B1 | 6/2004 | Suzuki et al. |
| 6,753,057 B1 | 6/2004 | Gardner |
| 2002/0043788 A1 | 4/2002 | Gallagher et al. |
| 2002/0079675 A1 | 6/2002 | Taoka et al. |
| 2002/0153741 A1 * | 10/2002 | Speelman et al. ............ 296/70 |
| 2003/0020263 A1 | 1/2003 | Preisler |
| 2004/0026902 A1 | 2/2004 | Yasuda et al. |

* cited by examiner

FIG.7

INTERIOR VEHICLE TRIM PANEL

CROSS REFERENCE TO RELATED APPLICATIONS

This application is a continuation-in-part of U.S. application Ser. No. 10/394,130 filed Mar. 21, 2003.

TECHNICAL FIELD

This invention relates to interior vehicle trim panels. More particularly, the invention relates to an improved seamless airbag door in an interior vehicle trim panel.

BACKGROUND OF THE INVENTION

Incorporation of airbags into vehicles has created many design challenges for automotive designers. It is desirable to incorporate an airbag into an instrument panel in front of the vehicle passenger seat. When incorporating an airbag into an instrument panel it is necessary to provide the airbag cover portion in the instrument panel that will reliably and safely tear, such that the passenger is protected. To this end, a tear seam has generally been provided in the airbag cover portion of an instrument panel to insure that the airbag will safely deploy.

Vehicle designers prefer to have a continuous surface on the front face of the instrument panel whenever possible, so they would prefer to avoid having a tear seam in the instrument panel. Thus, recently there has been an effort to achieve a "seamless" design wherein there is no indication on the front face of the instrument panel that the airbag is behind the instrument panel. To achieve this design, tear seams or tear strips provided in the instrument panel are only provided on the under face, and not on the front face of the instrument panel.

While it is also desirable that the instrument panel be relatively stiff so as to properly secure an air bag support assembly thereto, it is also desirable that the surface of the surface of the instrument panel which faces the occupants of a vehicle be soft and smooth to the touch.

The instrument panel must perform the utilitarian function of breaking apart along its tear seam to allow the air bag to exit through the airbag portion of the instrument panel when deployed. The airbag cover portion of an instrument panel is often complex and difficult to assemble. Accordingly, it is desirable to provide an improved instrument panel. Preferably, such an improved instrument panel would be soft and smooth to the touch, be less complex, and be easier to assemble than known instrument panels.

SUMMARY OF THE INVENTION

This invention relates to an overmolded interior vehicle trim panel. The trim panel includes a substrate having a front face and an under face. The under face has a tear seam integrally molded therein to allow an airbag to exit the substrate when the airbag is deployed. The tear seam defines an airbag door. An outer layer is bonded to the front face of the substrate in a mold, thereby forming an overmolded interior vehicle trim panel.

An alternate embodiment of the trim panel includes a sheet of hinge material attached to one of the substrate and the outer layer of the overmolded interior trim panel. A portion of the sheet of hinge material defines a hinge member.

Various objects and advantages of this invention will become apparent to those skilled in the art from the following detailed description of the preferred embodiment, when read in light of the accompanying drawings.

DETAILED DESCRIPTION OF THE INVENTION

Figure 1:
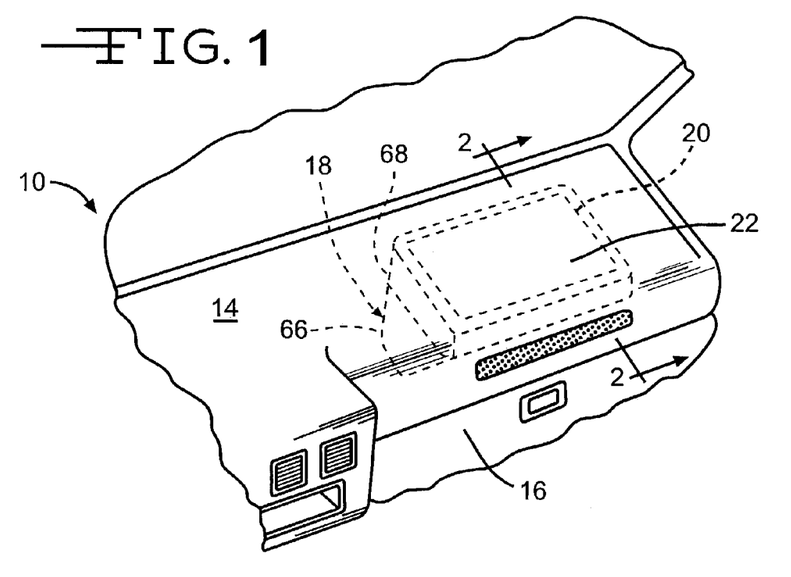
FIG. 1 is a partial perspective view of an instrument panel manufactured according to the invention.

Referring now to the drawings, there is illustrated in FIG. 1, an instrument panel, indicated generally at 10. The instrument panel 10 is an example of a trim panel for mounting in an interior cabin of a vehicle. It will be appreciated however, that the trim panel 10 of the subject invention may be any type of trim panel associated with a vehicle. Other suitable examples of trim panels include door panels, center consoles, overhead consoles, and other various interior panels for covering the sides, ceilings, and/or vertical pillars of the frame members of the vehicle.

The instrument panel 10 is installed on a vehicle frame generally in the area underneath the windshield and between the engine compartment and the interior of the vehicle. The instrument panel 10 can include any suitable frame structure (not shown) for supporting the instrument panel 10 to the vehicle frame. The portion of the exemplary instrument panel 10 illustrated in FIG. 1 includes a show, or front face 14 and a glove box 16. Since the front face 14 of the instrument panel 10 are within reach and direct sight of the occupants of the vehicle, it is desirable for this portion of the instrument panel 10 to be aesthetically pleasing in color and texture, as well as having a desirable tactile feel, such as a soft of slightly elastic feel.

Figures 5, 6:
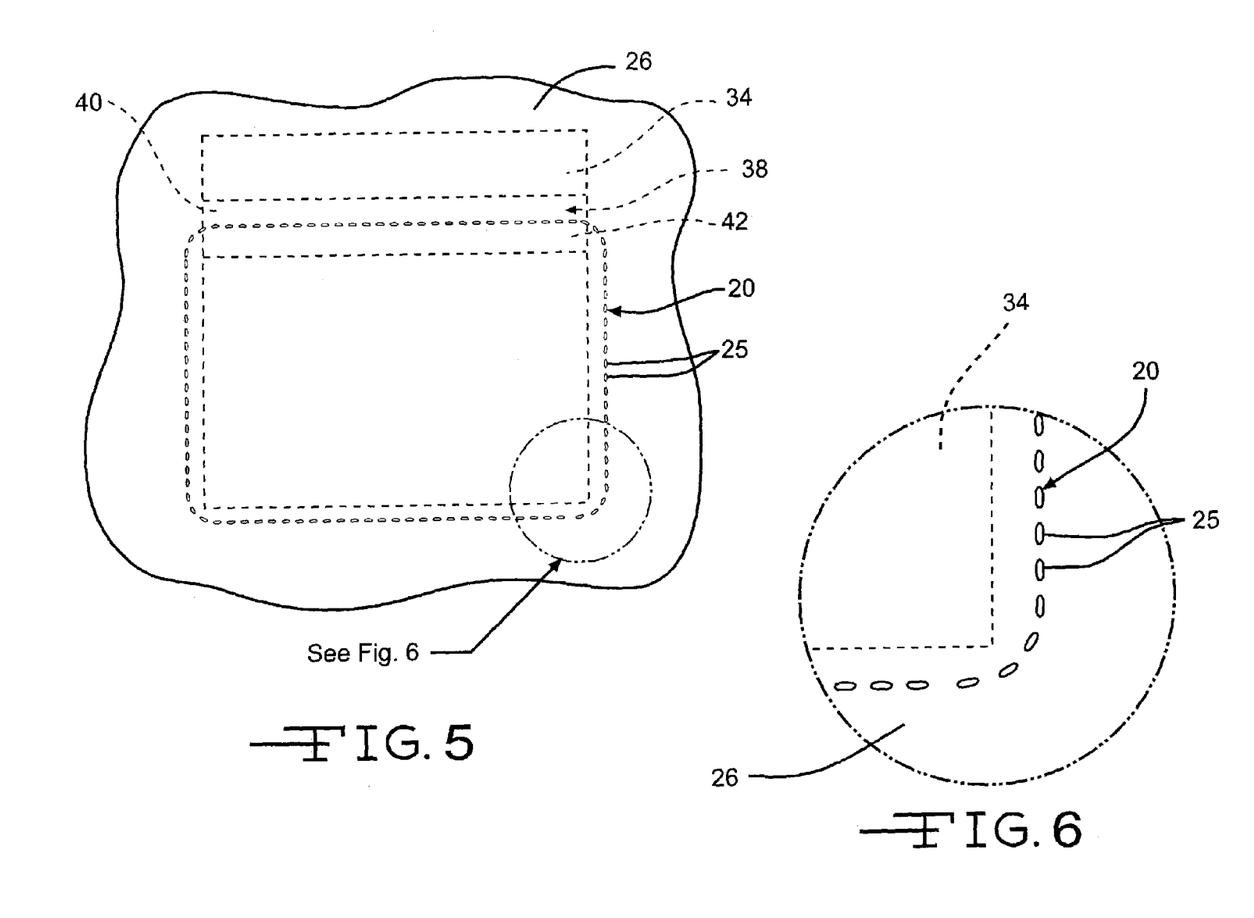
FIG. 5 is a bottom plan view of the instrument panel illustrated in FIG. 1, showing the tear seam and the sheet of hinge material.
FIG. 6 is an enlarged bottom plan view of a portion of the instrument panel illustrated in FIG. 5, showing the cavities defining the tear seam.
Figure 7:
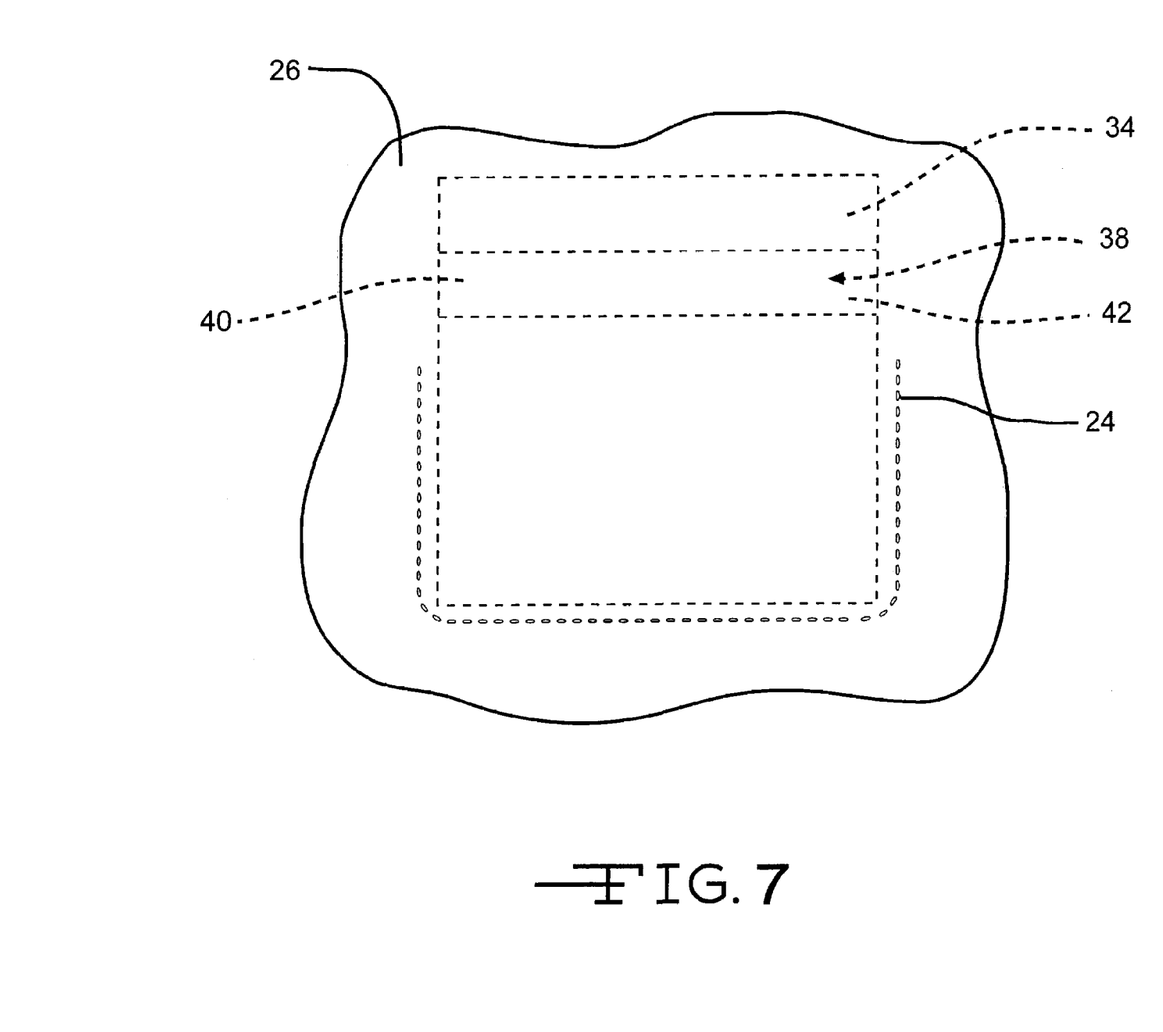
FIG. 7 is a bottom plan view of an alternate embodiment an instrument panel manufactured according to the invention, showing an alternate embodiment of the tear seam.

Shown in phantom outline in FIG. 1 is an airbag support assembly 18 and a tear seam 20 located behind the front face 14 of the instrument panel 10. Preferably, the tear seam 20 defines an airbag door 22. It will be appreciated that the tear seam 20 can be any weakened area of the instrument panel 10, such that an airbag 23, as shown in phantom outline in FIG. 2 can exit the instrument panel 10 when the airbag 23 is deployed, for example, during a vehicle collision. As shown in FIGS. 1 and 5, the tear seam 20 has a substantially rectangular shape. However, it will be appreciated that the tear seam 20 can be of any desired shape, such as a U-shaped tear seam 24, as shown in FIG. 7, or an H-shaped tear seam (not shown). The tear seam 20 can be formed by any desired method, such as by laser scoring. Preferably, the tear seam 20 is defined by a plurality of cavities 25 integrally formed in the instrument panel 10, as best shown in FIG. 6.

Figure 2:
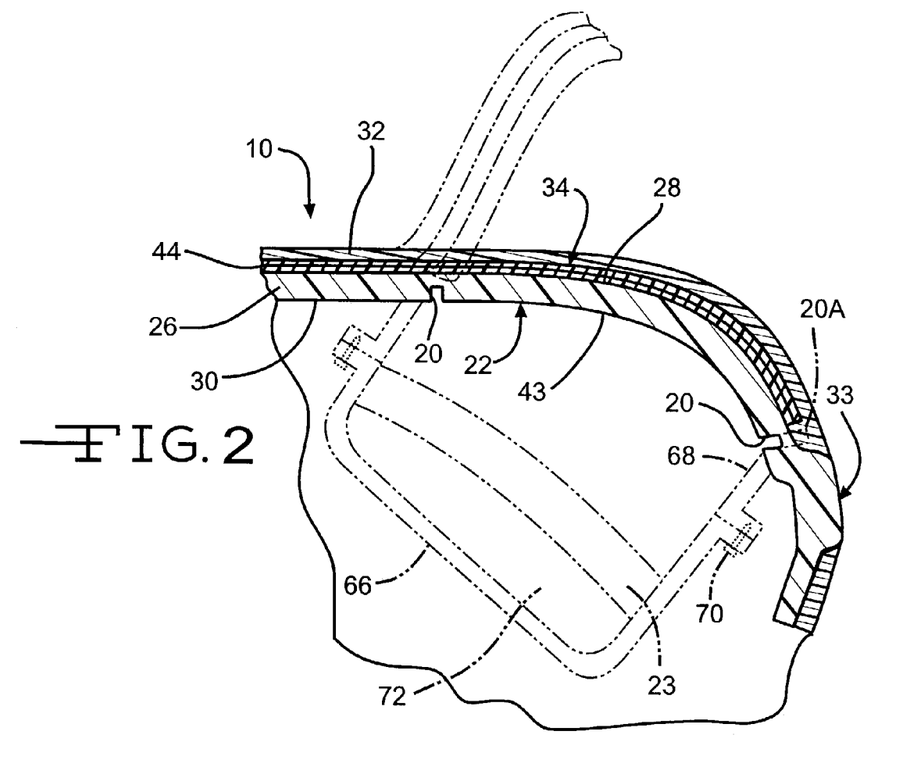
FIG. 2 is a cross-sectional view of a portion of the instrument panel taken along line 2—2 of FIG. 1, showing the airbag door.

As shown in FIG. 2, the instrument panel 10 generally includes a substrate 26 and an outer layer 32. The substrate includes a front face 28 and an under face 30. The outer layer 32 generally covers the front face 28 of the substrate 26. The exposed surfaces of the substrate 26 are generally represented with stippling in FIG. 1. As will be discussed below in more detail below, an exposed portion 33 of the substrate 26 may be uncovered from the outer layer 32 to provide a two tone or dual material appearance. Portions of the substrate 26 may be exposed and viewable by passengers of the vehicle. The substrate 26 and the outer layer 32 can have any suitable contour and apertures for receiving various vehicle controls, components, and systems.

The substrate 26 is preferably made of a relatively rigid material. Preferably, the instrument panel 10 is made of a polymer or plastic material. Examples of suitable materials for the instrument panel 10 include thermoplastic elastomer, thermoplastic elastomer polyolefin, polycarbonate, polypropylene, ABS (acrylonitrile butadiene styrene), polycarbonate ABS, SMA (styrene maleic anhydride), polyphenylene oxide (PPO), nylon, polyester, acrylic, and polysulfone. More preferably, the substrate 26 is formed of a molded plastic material, such as thermoplastic olefin (TPO). However, it will be appreciated that the substrate 26 can be formed of any other desired material. The substrate 26 can also have any suitable textured surface and color. The tear seam 20 is formed in the under face 30 of the substrate 26.

An outer layer 32 is bonded to the front face 28 of the substrate 26. The outer layer 32 is preferably made of a softer material than the substrate 26 and has a generally soft tactile feel compared to the substrate 26. Preferably, the outer layer 32 is made of a polymer or synthetic rubber. Examples of suitable materials for the outer layer 32 include thermoplastic elastomer, thermoplastic elastomer polyolefin. The outer layer 32 can also have any suitable textured surface and color. Preferably, the outer layer 32 is of a different material than the substrate 26 so that the surface of the outer layer 32 has a different tactile characteristic than the surface of the substrate 26. For example, the substrate 26 can have a lower coefficient of friction than the outer layer 32. More preferably, the outer layer 32 is formed of thermoplastic elastomer (TPE) that forms an outer decorative surface of the instrument panel 10.

The outer layer 32 can be bonded to the substrate 26 by any desired method. Preferably, the outer layer 32 is mechanically bonded to the substrate 26 in a mold. More preferably, the outer layer 32 is mechanically bonded to the substrate 26 in a two-shot injection mold, thereby defining an overmolded instrument panel 10. It will be appreciated that the outer layer 32 can be bonded to the substrate 26 by any other desired method, such as by spraying the outer layer 32 onto the front face 28 of the substrate 26.

It will be appreciated that various covers and panels (not shown) may be also be attached to the substrate 26 or the outer layer 32 to cover selected positions thereof. For example, an aesthetically pleasing trim panel, such as a faux wood or carbon fiber panel (not shown) may be used to cover a portion of the substrate 26. Other components, such as vent covers, display devices, electronic controls, audio/video entertainment units, and the like may be attached to the substrate 26 of the instrument panel 10.

In the exemplary embodiment illustrated in FIG. 2, a sheet of a sheet of hinge material 34 is attached between the substrate 26 and the outer layer 32. Preferably, the hinge material 34 is attached to the airbag door 22 during a molding process, such as insert molding, compression molding, two-shot molding, and the like. However, the hinge material 34 can be attached to the airbag door 22 by any other desired method. A portion of the hinge material 34 defines a hinge member 38 having a first end 40 and a second end 42, as shown in FIGS. 5 and 7. It will be appreciated that, if desired, the hinge material 34 can be embedded within the substrate 26, embedded within the outer layer 32, or bonded to an under face 43 of the airbag door 22.

Preferably, the hinge material 34 is attached to substantially the entire airbag door 22, such that the hinge material 34 substantially covers all of the under face 30 within the tear seam 20, as shown in FIG. 5. It will be understood that "substantially all of the under face" is defined herein as within the range of from about 80 percent to about 100 percent of the under face 30 within the tear seam 20. The sheet of hinge material 34 is preferably formed of a relatively flexible material. More preferably, the hinge material 34 is formed of thermoplastic elastomer (TPE). It will be appreciated however, that the hinge material 34 can be any desired material, such as steel.

The sheet of hinge material 34 preferably includes a scrim 44 attached thereto. Such a scrim 44 provides increased tensile strength to the sheet of hinge material 34. Preferably, the scrim 44 is embedded within the sheet of hinge material 34 by any desired method, such as insert molding, compression molding, two-shot molding, and the like. More preferably, the scrim 44 is embedded within the sheet of hinge material 34 during an extrusion process, as is known to one skilled in the art. The scrim 44 can be formed from any desired material, such as polyester or nylon.

Figure 3:
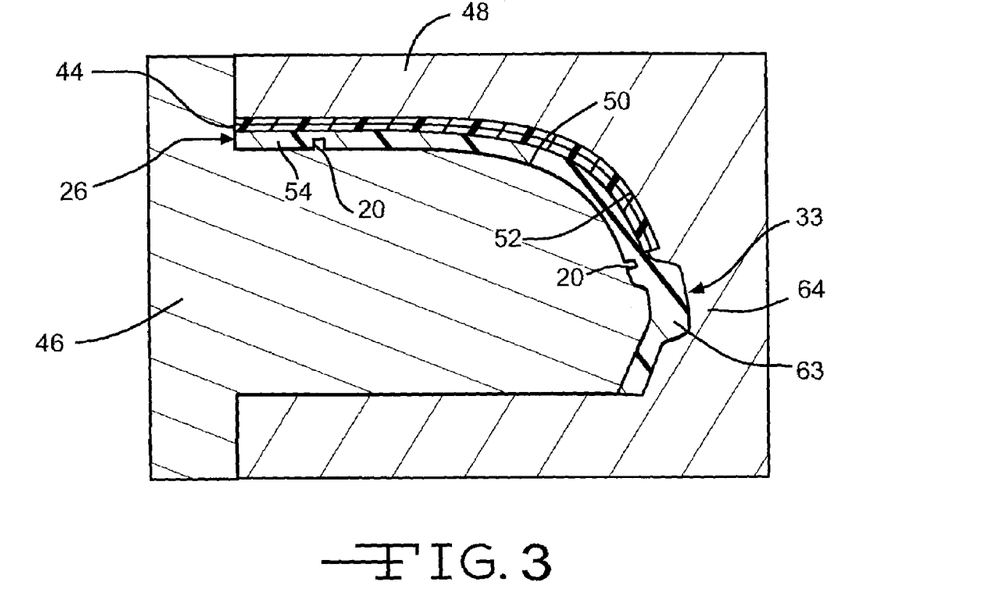
FIG. 3 is a cross-sectional view of a first mold assembly for manufacturing the instrument panel illustrated in FIG. 1.

The instrument panel 10 or other vehicle components are preferably manufactured by a generally two step mold process, as schematically illustrated in FIGS. 3 and 4 with respect to the cross sectional view of FIG. 2. As shown in FIG. 3, a first mold structure 46 is movably mounted relative to a second mold structure 48. The mold structures 46 and 48 include contour surfaces 50 and 52, respectively, facing one another in a spaced apart relationship which define a cavity 54. The cavity 54 generally corresponds to the shape and the dimension of the substrate 26 and the sheet of hinge material 34. The first and second mold structures 46 and 48 are moved together to their position illustrated in FIG. 3, and the sheet of hinge material 34 is disposed within the cavity 54. A first material (as shown in section in the cavity 54) is the introduced into the cavity 54 to form the substrate 26. The first material is introduced into the cavity 54 in a liquefied form and is partially or completely cooled and/or cured to form the substrate 26. The surface 52 corresponds to the front face 28 of the substrate 26 facing the interior of the vehicle, as shown in FIG. 1. The surface 50 generally corresponds to the under face 30 (not viewable in FIG. 1) facing the engine compartment.

Figure 4:
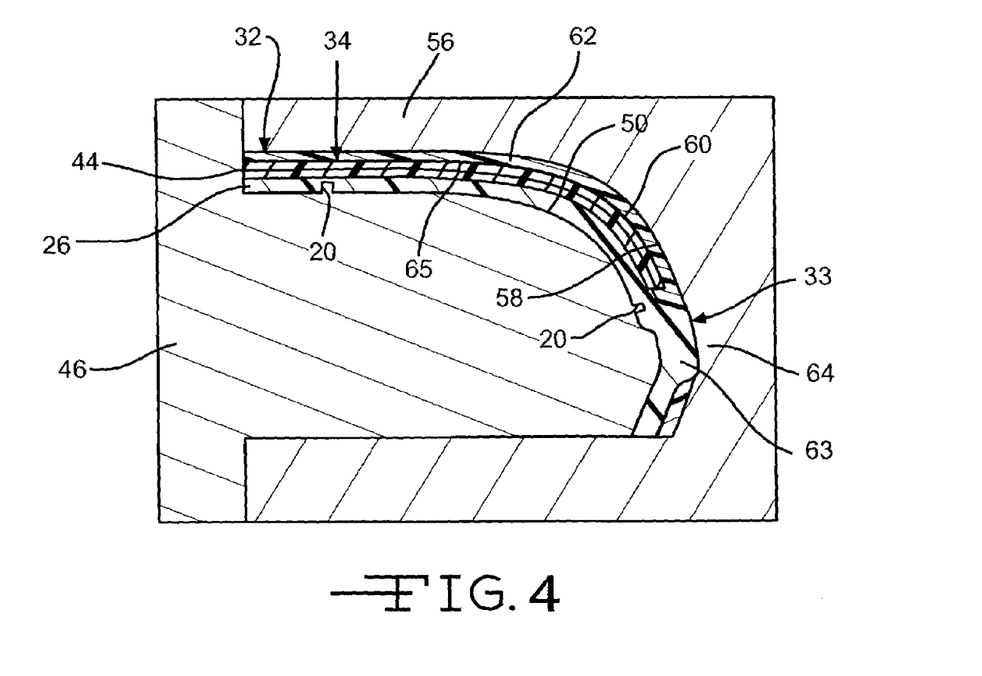
FIG. 4 is a cross-sectional view of a second mold assembly for manufacturing the instrument panel illustrated in FIG. 1.

Next, the second mold structure 48 is moved from the first mold structure 46, and a third mold structure 56 is generally positioned in its place, as shown in FIG. 4. Preferably, the substrate 26 and the sheet of hinge material 34 remain on the first mold structure 46 during replacement of the second mold structure 48. The third mold structure 56 includes a contour surface 58 facing the substrate 26 and the contour surface 50 of the first mold structure 46. The contour surface 58 of the third mold structure 56 and a surface 60 of the sheet of hinge material 34 are spaced apart from one another to define a cavity 62. The cavity 62 generally corresponds to the shape and dimension of the outer layer 32. A second material is then introduced into the cavity 62 to form the outer layer 32 such that the outer layer 32 is overmolded onto the surface 36 substrate 26.

It should be understood that the first and second materials can be introduced into the cavities 28 and 38 at any suitable temperature and pressure and with or without any other materials, such as for example, a blowing agent. Alternatively, either the substrate 26 and/or the outer layer 32 may be formed by a reaction injection molding process mixing two different materials together, such as a resin and a catalyst. For example, it may be preferred to form the outer layer 32 with a liquid two component urethane injected under low pressure without a blowing agent such that the outer layer 32 remains a solid skin.

The second material of which the outer layer 32 is made of may include an optional adhesive promoter to form a bond between the surface 36 of the substrate 26 and the outer layer 32. The first and second materials could also be heated or maintained at an adequate temperature so that a melted bond formed therebetween. Alternatively, a separate adhesive layer (not shown) could be introduced between the substrate 26 and the outer layer 32 to form a laminated instrument panel 10.

The combination substrate 26 and the outer layer 32 are then removed from first and third mold structures 46 and 56, thereby forming the portion of the instrument panel 10. The mold structures can be any conventional mold structures and can be positioned and moved by any suitable conventional means. For example, the first mold structure 46 may remain stationary, and the second and third mold structures 48 and 56 being moved into and out of their respective positions relative to the first mold structure 46. Although the first mold structure 46 is shown and described as being stationary, it should be understood that any of the mold structures can be moved to any position relative to one another throughout the process to manufacture the instrument panel 10.

The instrument panel 10 may be formed such that the outer layer 32 does not completely overmold the substrate 26, thereby revealing the exposed portion 33. This provides an instrument panel 10 having a decorative two-tone, material appearance. As shown in FIG. 4, the third mold structure 56 includes a portion 64 which covers the exposed portion 33 of the substrate 26 to prevent the second material from overmolding onto the substrate 26. Although not necessary, it is preferred that the surfaces of the instrument panel 10 facing the interior of the vehicle are generally flush with one another. To accomplish this, the substrate 26 is formed with an outwardly extending ridge 63 positioned so that its outward surface is flush with the outward surface of the outer layer 32. Although the exposed portion 33 of the substrate 26 is shown at some intermediate point in the instrument panel 10 such that the exposed portion 33 is enclosed or surrounded by the outer layer 32, it should be understood that the exposed portion, or a plurality of exposed portions, may be formed anywhere on the instrument panel 10, for example, on the edge thereof.

The outer layer 32 defines the front face 14 of the instrument panel 10, and includes an under face 65. As shown in FIG. 2, a portion of the tear seam 20 can extend through the substrate 26 to the under face 65 of the outer layer 32. If desired, the tear seam can also extend through a portion of the outer layer 32, as shown by a phantom outline 20A. However, it will be appreciated that, preferably, the tear seam 20 does not extend into or through the hinge member 38 of the outer layer 32.

When the U-shaped tear seam 24, as shown in FIG. 7, is provided, the tear seam 24 preferably extends between the first and the second ends 40 and 42, respectively, of the hinge member 38, such that an open end of the U-shaped tear seam 24 defines the hinge member 38.

Shown in phantom outline in FIG. 2, is an airbag housing 66 and an airbag collar 68. The airbag collar 68 is attached to the under face 30 of the substrate 26 about the tear seam 20. The collar 68 is preferably formed of a molded plastic material, such as TPO. However, it will be appreciated that the collar 68 can be formed of any other desired material. The collar 68 is attached to the substrate 26 by any desired method, such as by vibration welding. It will be appreciated however, that the collar 68 can be integrally formed with the substrate 26 or can be attached to the substrate 26 by any other desired attachment method.

Preferably, the airbag housing 66 is attached to the collar 68 with threaded fasteners 70. However, threaded fasteners 70 are not required, and the airbag housing 66 can be attached to the collar 68 by any desired attachment means. The airbag housing 66 preferably includes an airbag inflator 72 and the airbag 23. The airbag inflator 72 and the airbag 23 are shown schematically in FIG. 2 for illustration purposes since they are known in the art and their construction forms no part of the invention. As will be understood by one of ordinary skill in the art, the shape of the airbag housing 66, airbag inflator 72, and airbag 23 may vary from that shown.

As best shown in FIG. 2, when the airbag 23 deploys it will initially be forced against the under face 43 of the airbag door 22. The airbag 23 then ruptures the instrument panel 10 along the tear seam 20 such that the airbag door 22 (the portion of the instrument panel 10 within the outline of the tear seam 20) separates from the rest of the instrument panel 10 and moves outward of the instrument panel 10. The hinge member 38 of the hinge material 34 permits the airbag door 22 to rotate outwardly so that the airbag 23 can be released into the passenger compartment of the vehicle. During and after deployment of the airbag 23 the airbag door 22 remains attached to the instrument panel 10 by the hinge member 38 of the hinge material 34.

The principle and mode of operation of this invention have been described in its preferred embodiment. However, it should be noted that this invention may be practiced otherwise than as specifically illustrated and described without departing from its scope.

What is claimed is:

1. An overmolded interior vehicle trim panel comprising:
a substrate having a front face and an under face, said under face having a tear seam integrally molded therein to allow an airbag to exit said substrate when said airbag is deployed, said tear seam defined by a plurality of cavities integrally formed in said substrate, said tear seam defining an airbag door;
an outer layer attached to at least a portion of said front face of said substrates said outer layer including a front face and an under face; and
a scrim disposed between said substrate and said outer layer, said scrim defining a hinge member for retaining said airbag door to said interior vehicle trim panel when said airbag is deployed, said hinge member having a first end and a second end, and a portion of said tear seam extending through said substrate and a portion of said outer layer, said portion of said tear seam in said outer layer extending between said first and said second ends of said hinge portion.

2. The trim panel according to claim 1, further including a sheet of hinge material attached to one of said substrate and said outer layer of said overmolded interior trim panel, a portion of said sheet of hinge material defining said hinge member.

3. The trim panel according to claim 2, wherein said sheet of hinge material is integral with said substrate.

4. The trim panel according to claim 2, wherein said sheet of hinge material is integral with said outer layer.

5. The trim panel according to claim 2, wherein a portion of said sheet of hinge material covers said tear seam.

6. The trim panel according to claim 2, wherein said sheet of hinge material and said scrim are formed by extrusion.

7. The trim panel according to claim 2, wherein said scrim is embedded within said sheet of hinge material.

8. The trim panel according to claim 2, wherein said scrim is attached to an outer surface of said sheet of hinge material.

9. The trim panel according to claim 1, wherein said outer layer is mechanically bonded to said substrate.

10. The trim panel according to claim 1, wherein said outer layer is sprayed on to said front face of said substrate.

11. The trim panel according to claim 1, wherein when said airbag is deployed, said airbag door remains attached to said substrate at said hinge member.

12. The trim panel according to claim 1, wherein said tear seam is substantially U-shaped, an open end of said U-shaped tear seam defining said hinge member.

13. The trim panel according to claim 1, wherein said trim panel is an instrument panel.

14. The trim panel according to claim 1, wherein said tear seam is defined by a plurality of cavities integrally formed in said substrate.

15. An overmolded interior vehicle trim panel comprising:

an outer layer;

a separate sheet of hinge material attached to said outer layer, said sheet of hinge material including a scrim embedded therein, said scrim defining a hinge member; and a substrate attached to said sheet of hinge material such that said sheet of hinge material is disposed between said outer layer and said substrate, said substrate having a front face and an under face, said under face having a tear seam integrally molded therein to allow an airbag to exit said substrate when said airbag is deployed, said tear seam defining an airbag door, such that said airbag door is retained to said sheet of hinge material by said hinge member when said airbag is deployed.

* * * * *

UNITED STATES PATENT AND TRADEMARK OFFICE
CERTIFICATE OF CORRECTION

PATENT NO.    : 7,014,208 B2
DATED         : March 21, 2006
INVENTOR(S)   : Todd DePue et al.

It is certified that error appears in the above-identified patent and that said Letters Patent is hereby corrected as shown below:

Column 6,
Line 55, delete "substrates" and insert -- substrate, --.

Signed and Sealed this

Ninth Day of May, 2006

JON W. DUDAS
*Director of the United States Patent and Trademark Office*